(12) United States Patent  (10) Patent No.: US 8,317,960 B2
Montesano Benito et al.  (45) Date of Patent: Nov. 27, 2012

(54) PROCESS FOR IMPROVING THE REFLECTIVITY OF REFLECTIVE SURFACES OF ANTENNAS

(75) Inventors: Carlos Enrique Montesano Benito, Madrid (ES); Eduardo Ozores Monge, Madrid (ES)

(73) Assignee: Eads Casa Espacio S.L, Madrid (ES)

( * ) Notice: Subject to any disclaimer, the term of this patent is extended or adjusted under 35 U.S.C. 154(b) by 255 days.

(21) Appl. No.: 12/782,491

(22) Filed: May 18, 2010

(65) Prior Publication Data

US 2010/0288433 A1  Nov. 18, 2010

(30) Foreign Application Priority Data

May 18, 2009  (EP) .................................. 09382071

(51) Int. Cl.
*B29C 65/02* (2006.01)
*B32B 37/06* (2006.01)
*B32B 38/10* (2006.01)
(52) U.S. Cl. ..... 156/256; 156/242; 156/285; 156/307.3; 156/308.2; 156/327
(58) Field of Classification Search .................. 156/242, 156/256, 285, 307.3, 307.7, 308.2, 327
See application file for complete search history.

(56) References Cited

U.S. PATENT DOCUMENTS 6,113,730 A * 9/2000 Ohya et al. ................. 156/307.3
2003/0102077 A1 6/2003 Ko

FOREIGN PATENT DOCUMENTS

| JP | 1184999 | 7/1989 |
| JP | 2154499 | 6/1990 |
| WO | 2008/071922 | 6/2008 |

OTHER PUBLICATIONS

EP09382071.0 extended European Search Report dated Nov. 10, 2009 (8 pages).

* cited by examiner

*Primary Examiner* — Linda L Gray
(74) *Attorney, Agent, or Firm* — Michael Best & Friedrich LLP

(57) ABSTRACT

A process for improving the reflectivity of reflective surfaces made of a composite.
The process includes laminating a layer of metalized plastic on at least one layer of composite, bonding the metalized plastic to a substrate in a preimprgenated state;
  cutting strips or patterns of an assembly of the layer of composite and the layer of metalized plastic;
  laminating strips or patterns of the assembly as a first layer on a molding jig;
  adding additional composite layers to the first layer;
  preparing a vacuum and curing bag;
  introducing the assembly in an autoclave;
  performing a curing cycle, bonding the layer of metalized plastic to the rest of the substrate by polymerization of a resin in the composite.

13 Claims, 3 Drawing Sheets

PROCESS FOR IMPROVING THE REFLECTIVITY OF REFLECTIVE SURFACES OF ANTENNAS

FIELD OF THE INVENTION

The present invention relates to a process for improving the reflectivity of reflective surfaces of antennas, said reflective surfaces being made of a composite.

BACKGROUND OF THE INVENTION

An antenna is a device designed for the purpose of emitting or receiving electromagnetic waves towards open space. While a transmitter antenna transforms voltages into electromagnetic waves, a receiver antenna performs the reverse function. The traditional classification of antennas is essentially based on the manner in which the electromagnetic field is distributed in the antenna itself or on the technology used, although classifications can also be made from a more practical point of view, based on their features and technology, their specific uses and their operation.

In the case of antennas with a reflector, the manner of producing and receiving electromagnetic waves is done through one or more reflective surfaces, also known as reflectors. If a large main reflector and/or large focal distance involving large distances to the focus needs to be used, then one or more secondary reflectors or subreflectors are normally used, apart from the main reflector. Whereas the main reflector reflects the incident radiation towards the primary focus, the secondary reflector or subreflector has one focus in common with the parabolic reflector and forwards the electromagnetic waves to the secondary focus.

Thus, the present invention relates to reflective elements (main reflector and/or subreflectors) of the antennas on board telecommunications, radar, radiometer, radio telescope and Earth observation satellites, as well as for other applications. When the reflective elements are made of a composite, the loss of reflectivity (reflectivity being the ability of reflective surfaces to reflect the incident radiation thereon) increases as the frequency increases. Therefore, depending on the work frequency of the mentioned antennas, the reflectivity of their reflective surfaces must be high enough so as to not cause losses which unacceptably degrade the features of said antennas.

In many applications, instead of using metallic materials to construct the reflective surfaces, composites formed by a fiber (carbon, glass, quartz, etc.) and a resin matrix are used. These materials have either an intrinsically low reflectivity (quartz, glass) or a reflectivity which deteriorates to unacceptable values for high frequencies (from 15 GHz or 20 GHz) due to the ohmic losses occurring when carbon fiber is used as a composite, both if this carbon fiber is painted or unpainted, it being necessary to consider solutions improving the reflectivity of these surfaces.

One of the processes used today for improving the reflectivity of antenna reflectors made of a composite consists of arranging a metallized layer (process referred to as metallization) on said reflectors. The reduction in the loss of reflectivity is a function of the temperature, of the purity of the metallized layer and of the thickness thereof.

Multiple methods of metallization are known which can be applied to components manufactured of composites, as is the case of antenna reflectors, particularly for satellites. These methods can be included in three groups: physical methods, chemical methods and others.

The physical methods can in turn be sub-divided into two groups: metal spraying processes and vacuum deposition processes. The metal spraying can in turn be performed by several techniques (flame spraying, electro spraying and plasma spraying). They all essentially consist of raising the temperature of the metal to be deposited above the melting temperature thereof, subsequently projecting the resulting particles by means of special guns. Vacuum deposition can also use several techniques (vaporization, sputtering and ion plating), atoms of metal or vaporized metal being deposited in all of them on the substrate to be metallized in a vacuum environment.

The chemical methods in turn include several processes, such as auto-catalytic coating, electrodeposition and chemical vapor deposition. Auto-catalytic coating consists of activating the surfaces to be metallized such that metal ions generated in a solution prepared for such purpose are deposited thereon. Electrodeposition consists of depositing a metal on a surface upon passing a current in a bath in which the surface to be metallized is introduced.

Within other methods processes not covered by the previous classifications are considered, such as gluing thin sheets of metal either continuously or in strips.

Out of all the mentioned methods, the method which has been used in spatial applications, specifically for satellites, until now has been the vacuum deposition method. This technique has, however, serious drawbacks and limitations, as it is an expensive technique requiring the use of very sophisticated installations, there being virtually no installations of this type for large sizes, the few existing installations furthermore being non-industrial, rather being of a scientific institution, which has limited their use to very specific cases, such as that of telescope mirrors on board satellites.

In addition, the vacuum deposition metallization technique commonly used, in which the material with elevated conductivity is mainly aluminum, produces very thin and very sensitive metallization depositions arranged on the outer face of the surfaces, these metallization layers being very easily damaged, even when cleaning the surfaces, the metallization layer in many cases being removed when the process of cleaning said surfaces is performed. In the event that the metallization layer is damaged, it is necessary to remove the entire arranged layer and again perform the metallization process once more, which involves a very high cost.

The present invention is aimed at solving the previously mentioned drawbacks.

SUMMARY OF THE INVENTION

Thus, the invention describes a process for improving the reflectivity of reflective surfaces of antennas arranged in satellites, said reflective surfaces being made of a composite, upon imbedding a layer of metallized dielectric plastic between the layers of composite or in the outer surface of the reflective surface of the antenna which must have given reflective characteristics in the antenna. This layer of metallized dielectric plastic is arranged while laminating the composite that is going to form the mentioned reflective surface.

According to the process of the invention, the layer of metallized plastic which is imbedded in the reflector can be arranged in strips with a suitable size in order to achieve optimal adaptation to the reflective surface to be metallized, or forming different shapes following determined patterns. The reflective surface can then be metallized continuously, i.e., the previous strips being adapted such that they completely cover the entire reflective surface or arranging the previous strips discontinuously, such that they do not completely cover the previous reflective surface, but rather they are only arranged in some determined areas thereof. The metallization of the metallized strips forming determined patterns or shapes can also be removed to achieve special effects. When the metallization is discontinuous (either by means of metallized strips or by means of patterns) it can in turn be periodic or non-periodic.

These periodic or non-periodic metallization shapes can achieve several effects improving the characteristics of the antennas, such as polarizing the electromagnetic fields, altering their phase and amplitude and, in summary, controlling the radiation diagram of the antenna in a simple manner.

According to the invention, the metallized layer is bonded to the composite substrate of the reflective surface by the resin itself of the composite, as this metallized layer is imbedded during the process of laminating the composite of the reflective surface itself, thus entering the curing cycle as part of the assembly of the reflective surface (formed by the composite together with the metallized plastic).

The process of the invention for performing the metallization of reflective surfaces of antennas, particularly for satellites, said reflective surfaces being made of composite, by means of which the reflectivity of said reflective surfaces is improved, upon reducing the losses of reflectivity thereof, comprises the following steps, although according to the specific application for which the reflective surface of an antenna is intended, some of these steps may not be necessary:

a) laminating the metallized plastic on the composite of the reflective surface;
b) cutting the assembly of composite and metallized plastic;
c) forming strips or patterns with a determined shape from the assembly of composite and metallized plastic of step b);
d) laminating the strips or patterns of step c), formed by the assembly of composite and metallized plastic, as a first layer on the molding jig, the metallized plastic side of the strips or patterns being in contact with the molding jig;
e) ending the lamination process, adding the rest of the layers of composite of the reflective surface to the first layer made in step d);
f) preparing the vacuum and curing bag;
g) introducing the assembly obtained in e) in the autoclave;
h) performing the curing cycle on the previous assembly, which will be defined by the resin of the composite of the reflective surface.

Other features and advantages of the present invention will be understood from the following detailed description of an illustrative embodiment of the object of the invention in relation to the attached figures.

DETAILED DESCRIPTION OF THE INVENTION

Figure 1:
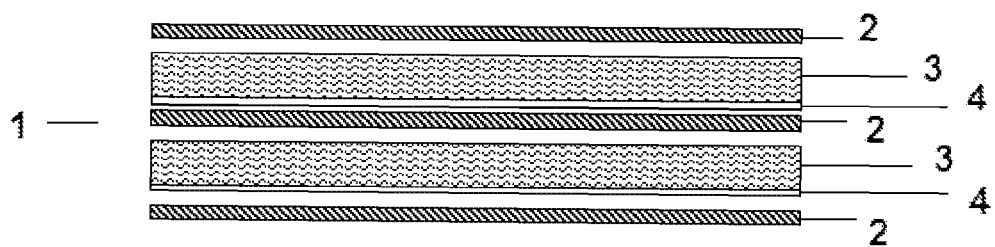
FIG. 1 shows how the layers of the different materials are arranged in a metallized reflective surface of an antenna according to a first embodiment of the process of the present invention.

The invention describes a process for improving the reflectivity of reflective surfaces 1 of antennas arranged in satellites, said reflective surfaces 1 being made of a composite. The composite comprises a resin matrix and fibers, these fibers preferably being carbon fibers. According to the process of the invention, a layer of metallized dielectric plastic 3 is imbedded by means of a metallization layer 4 between the layers of composite 2 (FIG. 1) or in the outer surface of the reflector of the antenna which must have given reflective characteristics (FIG. 2). The layer of metallized dielectric plastic 3 (metallized by means of the metallization layer 4) is arranged while laminating the composite which will form the mentioned reflector or reflective surface 1.

Figure 3:
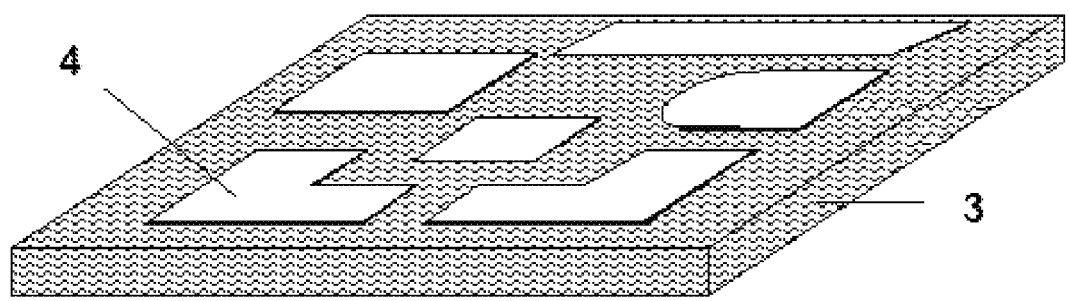
FIG. 3 shows a metallized reflective surface of an antenna on which a metallization has been performed, subsequently performing a partial removal thereof in order to achieve modifying the response of the electromagnetic waves, according to a third embodiment of the process of the present invention.
Figure 4:
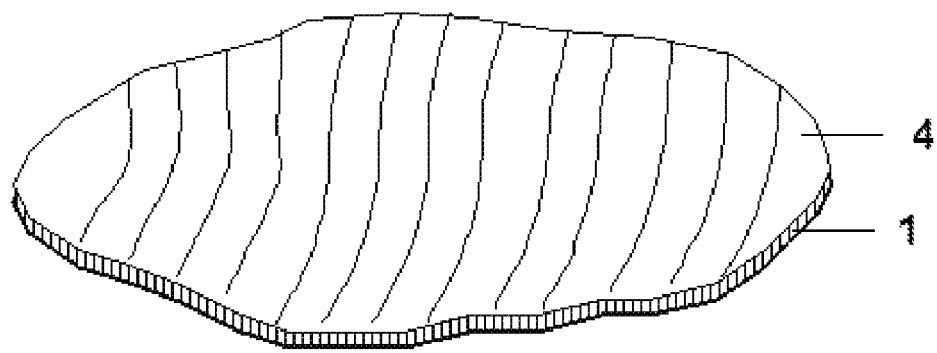
FIG. 4 shows a metallized reflective surface of an antenna comprising strips on which the metallization is arranged, according to a fourth embodiment of the process of the present invention.
Figure 5:
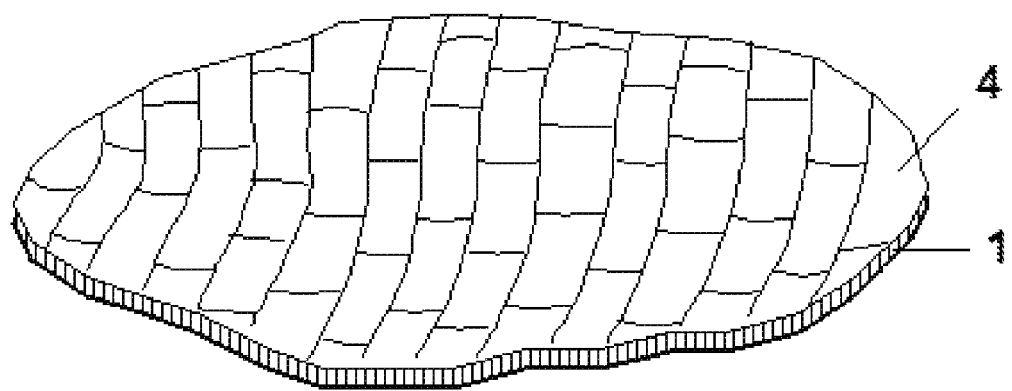
FIG. 5 shows a metallized reflective surface of an antenna comprising another type of strips on which the metallization is arranged, according to a fifth embodiment of the process of the present invention.

The layer of plastic 3 comprising the previous metallization layer 4 is imbedded in the reflective surface 1 and can be arranged in strips with a suitable size in order to achieve optimal adaptation to the reflective surface 1 to be metallized, or forming different shapes following determined patterns (FIGS. 3, 4 and 5). The reflective surface 1 can be metallized continuously (FIGS. 4 and 5), or discontinuously (FIG. 3). The metallization of the metallized strips forming determined patterns or shapes can be also be removed in order to achieve special effects. When the metallization is discontinuous, it can in turn be periodic or non-periodic.

The metallized layer 4 is bonded to the composite substrate 2 of the reflective surface 1 by the resin itself of the composite of layer 2, as this metallized layer 4 is imbedded during the process of laminating the composite 2 of the reflective surface 1 itself, thus entering the curing cycle as part of the assembly of the reflective surface 1 (formed by the composite 2 together with the plastic 3 comprising a metallization layer 4).

The process of the invention comprises the following steps (according to the application, some steps may not be necessary):

a) laminating the plastic 3 comprising a metallization layer 4 on the composite 2 of the reflective surface 1;
b) cutting the assembly of composite 2 and metallized plastic (layers 3+4);
c) forming strips or patterns with a determined shape from the assembly of composite 2 and metallized plastic (layers 3+4) of step b);
d) laminating the strips or patterns of step c), formed by the assembly of composite 2 and metallized plastic (layers 3+4), as a first layer on the molding jig, the metallized plastic side (layers 3+4) of the strips or patterns being in contact with the molding jig;
e) ending the lamination process, adding the rest of the layers of composite 2 of the reflective surface 1 to the first layer made in step d);
f) preparing the vacuum and curing bag;
g) introducing the assembly obtained in e) in the autoclave;
h) performing the curing cycle of the previous assembly, which will be defined or determined by the resin of the composite of the reflective surface 1.

Figure 2:
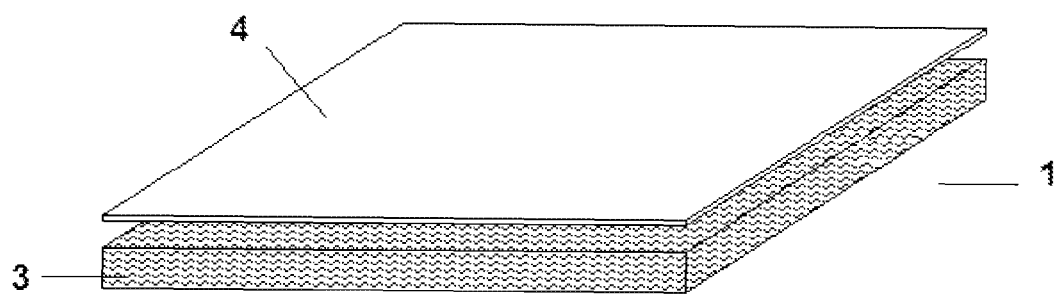
FIG. 2 shows how a continuous metallization layer is arranged on a metallized reflective surface of an antenna according to a second embodiment of the process of the present invention.

FIG. 1 shows how the layers of the different materials are arranged to form the reflective surface 1 with the process of the invention. According to the application, some of these layers may be partially or completely eliminated.

FIG. 2 in turn shows a layer of support plastic 3 on which the previously deposited continuous metallization layer 4 is seen.

FIG. 3 depicts a layer of plastic 3 on which the previously deposited metallization layer 4 can be seen after having partially removed said metallization layer 4 in order to achieve modifying the response of the electromagnetic waves. The part which remains metallized (layer 4) can be periodic or not and the patterns can be identical or different in each area. This metallized layer 4 could also be a negative image.

FIG. 4 shows a reflective surface 1 comprising metallized layers 4 arranged in the form of strips.

FIG. 5 shows a reflective surface 1 with another type of strips (the strips can have any shape and size), according to another embodiment of the invention.

FIGS. 3, 4 and 5 show different embodiments of the arrangement of the metallization layer 4. In all of them, the metallization layer 4 can be arranged between the layers of composite 2 (as shown in FIG. 1), or in the outer surface of the reflective surface 1 of the antenna, which must have given reflective characteristics (as shown in FIG. 2).

The plastic 3 comprising a metallization layer 4 is bonded to the composite 2 in step a) in its preimpregnated state. The sheets of the composite 2 and metallized plastic (layers 3+4) assembly are cut in step b) in a suitable manner in order to perform the lamination of step d).

In the curing process defined in the previous step h), the resin of the composite of layer 2 is polymerized, and with it, the metallized plastic (layers 3+4) and the composite substrate of layer 2 bond together.

In step d), for the purpose of protecting the metal of the metallization layer 4, the metallized plastic (layers 3+4) is placed with the plastic face (layer 3) arranged outwardly, such that the metallization layer 4 is protected since it is covered by the plastic of layer 3 and is therefore not exposed to the external environment or to possible contamination by contact or by lack of cleaning.

The difference of the process defined by the invention with respect to the mentioned known vacuum deposition metallization process, in which strips are glued, is based on the fact that in the invention, the adhesion is not performed by an adhesive which is incorporated as an element for performing the bond, but rather it is the resin itself of the layer of composite 2 which, upon polymerizing during the curing cycle, bonds the layer of metallized plastic (layers 3+4) to the rest of the substrate of the layer of composite 2.

In the process of the invention, the adhesion of the metallization layer or metallized layer 4 to the substrate of the composite of layer 2 is better than in the case of glued metallic layers (by means of the vacuum deposition or chemical deposition process), given that, during the entire polymerization process of the resin of the composite in step h), a pressure is maintained (that of the curing cycle) assuring suitable contact between the surfaces to be bonded, the previous adhesion being much better than the adhesion of metal deposition by vacuum or by chemical process, because in the last cases, the adhesion is very dependent on the suitable activation of the surfaces, as well as on the cleaning of the substrate of the composite of layer 2.

The process of the invention furthermore does not require complex metallization installations as in the known technique, but rather it can be performed in the same installations in which the elements of the composite are manufactured without having to change anything in the installation.

Thus, some of the main advantages of the process of the invention are:

- it simplifies the required process, given that it can be performed in the same installations in which the components or surfaces which are going to be metallized are manufactured, thus reducing the manufacturing times, since the components do not have to be transported outside the manufacturing installations for the same, this being a very relevant aspect in this type of products in which delivery times are always very critical;
- it simplifies the required process, given that it is the operator who laminates the composite of the reflective surface who also performs the metallization process of the invention at the same time;
- it improves the adhesion of the metallized layer 4 to the substrate of the composite of the layer of composite 2;
- it assures excellent homogeneity of the metallic layer or metallization layer 4 obtained by means of the mentioned process;
- it assures the protection of the metal of the metallization layer 4 in the lamination step, as the metallized plastic (layers 3+4) is arranged with the plastic (layer 3) arranged outwardly such that the metallization layer 4 is protected since it is covered by the plastic and is not exposed to the external environment or to possible contamination by contact or by lack of cleaning.

The process of the invention can be performed using any type of metallized plastic, which involves any type of plastic existing on the market (preferably Kapton, Kapton loaded with any type of material, Polyamide, Polyamide loaded with any type of material) or any type of metal (preferably aluminum, silver or gold). Likewise, the thickness of the metallization layer 4 can be any thickness, ranging from the finest thickness (in the order of 8 microns), to the thickest thickness (in the order of 50 microns or 100 microns). Furthermore, the substrate of the composite of layer 2 on which the process of the invention is performed can be of any type of composite in which the resin of said composite is polymerized in the curing process.

Another feature of the process of the invention is that the metallization (metallization layers 4) of the reflective surfaces 1 can be performed continuously (using metallization strips), FIGS. 4 and 5, or discontinuously (by means of metallization strips or by means of patterns), FIG. 3. When the metallization is discontinuous (FIG. 3), it may in turn be periodic or non-periodic. Being able to change this metallization in a periodic or non-periodic manner has the advantage of being able to change the electromagnetic characteristics of the reflective surface 1 of the antenna, filtering polarization, filtering frequencies or converting one polarization into another. By changing the polarization of the electromagnetic wave reflected by the reflective surface 1, accordingly the antenna, the electromagnetic behavior of said wave in turn changes, thus being able to control said behavior according to the required needs.

Those modifications comprised within the scope defined by the following claims can be introduced in the preferred embodiments described above.

The invention claimed is:

1. A process for improving the reflectivity of reflective surfaces (1) of an antenna, said reflective surfaces (1) being made of at least one layer of composite (2), characterized in that it comprises the following steps:
   a) laminating a layer of plastic (3) comprising a metallization layer (4) on the at least one layer of composite (2) that forms at least one of the reflective surfaces of the antenna, bonding the metallization layer (4) to a substrate of the at least one layer of composite (2) in a preimpregnated state of the at least one layer of composite using a resin of the at least one layer of composite;

b) cutting and forming strips or patterns of an assembly of the at least one layer of composite (2) and the layer of plastic (3) comprising the metallization layer (4);

c) laminating the strips or patterns of step b) as a layer on a molding jig;

d) preparing a vacuum and curing bag;

e) introducing the assembly into an autoclave;

f) performing a curing cycle of the assembly utilizing the vacuum, curing bag, and autoclave, in which the resin of the at least one layer of composite, upon polymerizing, bonds the layer of plastic (3) comprising the metallization layer (4) to the rest of the substrate of the at least one layer of composite (2).

2. The process for improving the reflectivity of reflective surfaces (1) of an antenna according to claim 1, characterized in that in step a), the layer of plastic (3) comprising the metallization layer (4) is arranged on a single layer of the at least one layer of composite (2).

3. The process for improving the reflectivity of reflective surfaces (1) of an antenna according to claim 1, characterized in that in step a), the layer of plastic (3) comprising the metallization layer (4) is arranged in an outer surface of the at least one of the reflective surfaces (1) of the antenna.

4. The process for improving the reflectivity of reflective surfaces (1) of an antenna according to claim 1, characterized in that in step a), the metallization layer (4) is arranged continuously on the layer of plastic (3).

5. The process for improving the reflectivity of reflective surfaces (1) of an antenna according to claim 1, characterized in that in step a), the metallization layer (4) is arranged discontinuously on the layer of plastic (3) in order to achieve modifying the reflectivity of the antenna by modifying a response of electromagnetic waves emitted or received by the antenna.

6. The process for improving the reflectivity of reflective surfaces (1) of an antenna according to claim 5, characterized in that the discontinuous metallization layer (4) can be periodic or non-periodic.

7. The process for improving the reflectivity of reflective surfaces (1) of an antenna according to claim 1, characterized in that in step c) a side of the layer of plastic (3) is in contact with the molding jig, such that the metallization layer (4) is covered by the layer of plastic.

8. The process for improving the reflectivity of reflective surfaces (1) of an antenna according to claim 1, characterized in that in step f), a pressure is maintained from a start of the curing cycle to an end of the curing cycle to assure the bonding of the layer of plastic (3) comprising the metallization layer (4) to the rest of the substrate of the at least one layer of composite (2) is appropriate.

9. The process for improving the reflectivity of reflective surfaces (1) of an antenna according to claim 1, characterized in that in step g), the curing cycle is determined by the resin of the at least one layer of composite.

10. The process for improving the reflectivity of reflective surfaces (1) of an antenna according to claim 1, characterized in that the at least one layer of composite (2) comprises a resin matrix and carbon, glass, or Kevlar fibers.

11. The process for improving the reflectivity of reflective surfaces (1) of an antenna according to claim 1, characterized in that a thickness of the metallization layer (4) ranges from the 4 microns to 100 microns.

12. The process for improving the reflectivity of reflective surfaces (1) of an antenna according to claim 1, characterized in that the reflective surfaces (1) are arranged in a satellite antenna.

13. The process for improving the reflectivity of reflective surfaces (1) of an antenna according to claim 1, characterized in that in step a), additional layers of composite are laminated to the assembly of the at least one layer of composite (2), metallization layer (4), and layer of plastic (3).

* * * * *